(12) United States Patent
Bekmambetov et al.

(10) Patent No.: US 10,430,212 B1
(45) Date of Patent: *Oct. 1, 2019

(54) METHOD FOR RECORDING, EDITING AND REPRODUCTION OF COMPUTER SESSION

(71) Applicant: Screenshare Technology Ltd., Nicosia (CY)

(72) Inventors: Timur Bekmambetov, Moscow (RU); Guy Bedford, Cape Town (ZA); Daniel Kehoe, San Francisco, CA (US)

(73) Assignee: Screenshare Technology Ltd., Nicosia (CY)

( * ) Notice: Subject to any disclaimer, the term of this patent is extended or adjusted under 35 U.S.C. 154(b) by 65 days.

This patent is subject to a terminal disclaimer.

(21) Appl. No.: 15/708,312

(22) Filed: Sep. 19, 2017

Related U.S. Application Data

(63) Continuation-in-part of application No. 15/208,643, filed on Jul. 13, 2016, now Pat. No. 10,083,159.

(51) Int. Cl.
| | | |
|---|---|---|
| *G06F 16/70* | (2019.01) | |
| *G06F 9/451* | (2018.01) | |
| *G06F 17/22* | (2006.01) | |

(52) U.S. Cl.
CPC .............. *G06F 9/451* (2018.02); *G06F 16/70* (2019.01); *G06F 17/2247* (2013.01)

(58) Field of Classification Search
CPC ....... G06F 9/451; G06F 16/70; G06F 17/2247
See application file for complete search history.

(56) References Cited

U.S. PATENT DOCUMENTS

| | | | | |
|---|---|---|---|---|
| 6,549,216 | B1* | 4/2003 | Schumacher | G06F 9/45512 714/E11.193 |
| 7,653,896 | B2* | 1/2010 | Herdeg, III | G06F 9/45512 715/704 |
| 7,801,905 | B1* | 9/2010 | Singh | G06F 11/3495 707/661 |
| 8,407,321 | B2* | 3/2013 | Mickens | G06F 11/3414 709/218 |
| 9,766,769 | B1* | 9/2017 | Webber | G06F 3/0481 |
| 10,083,159 | B1* | 9/2018 | Bekmambetov | G06F 17/24 |
| 2002/0161794 | A1* | 10/2002 | Dutta | G06F 16/957 715/205 |
| 2004/0054728 | A1* | 3/2004 | Rust | H04L 29/06 709/205 |
| 2004/0080622 | A1* | 4/2004 | Gombert | G06F 1/1605 348/207.99 |
| 2007/0050844 | A1* | 3/2007 | Lebel | G06F 11/3414 726/13 |
| 2008/0077850 | A1* | 3/2008 | Gauthier | G06F 17/218 715/234 |

(Continued)

*Primary Examiner* — Hien L Duong
(74) *Attorney, Agent, or Firm* — Bardmesser Law Group

(57) ABSTRACT

A method and system for recording, editing, and playback of user computer sessions, which captures a series of events during the session, including the initial state of desktop and all user interactions with the application(s). The events are recorded and stored on the server as a set of JSON objects, and the frames representing the session are editable, including insertion of different text, audio, video and images, into the recording. The recorder application comprises a core engine implemented in JavaScript and various server configurations available, either local or remote, for editing and playback.

26 Claims, 18 Drawing Sheets

(56) References Cited

U.S. PATENT DOCUMENTS

| | | | |
|---|---|---|---|
| 2012/0017141 A1* | 1/2012 | Eelen | G09B 5/065 |
| | | | 715/202 |
| 2013/0218315 A1* | 8/2013 | Jaeger | G06F 9/453 |
| | | | 700/94 |
| 2014/0212107 A1* | 7/2014 | Saint-Jean | G11B 27/031 |
| | | | 386/241 |
| 2014/0281983 A1* | 9/2014 | Xian | G06F 3/167 |
| | | | 715/716 |
| 2014/0325431 A1* | 10/2014 | Vranjes | G06F 3/0481 |
| | | | 715/788 |
| 2015/0052146 A1* | 2/2015 | Soon-Shiong | G06F 16/7837 |
| | | | 707/740 |
| 2016/0188548 A1* | 6/2016 | Ciabarra, Jr. | G06F 16/986 |
| | | | 715/234 |
| 2017/0019489 A1* | 1/2017 | Churchill | G06F 3/04842 |

* cited by examiner

RECORDING DATA FORMAT

| Web Page 1 | Initial State | Screen width |  |
| --- | --- | --- | --- |
|  |  | Screen height |  |
|  |  | URL |  |
|  |  | Scroll position |  |
|  |  | Active element |  |
|  |  | Html attribute |  |
|  |  | Html |  |
|  | Timeline | Event 1 | Type |
|  |  |  | ID |
|  |  |  | Time |
|  |  |  | ..... |
|  |  | Event 2 | ..... |
|  |  | Event n | ..... |
|  |  | ..... | ..... |
| Web Page 2 | Initial State | | |
|  | Timeline | | |
| Web Page n | ..... | | |

FIG. 4

FILES

| Playback-Server | | | | Record-Extension | | | | Recordings |
|---|---|---|---|---|---|---|---|---|
| Play.js | Index.js | Cert.pm | Key.pm | Record.js | Background.js | Popup.html | Popup-script.js | .... |

FIG. 5

METHOD FOR RECORDING, EDITING AND REPRODUCTION OF COMPUTER SESSION

CROSS REFERENCE TO RELATED APPLICATIONS

This application is a continuation in part of U.S. patent application Ser. No. 15/208,643, filed on Jul. 13, 2016, which is incorporated herein by reference in its entirety.

BACKGROUND OF THE INVENTION

Field of the Invention

This invention relates to a method and system for recording user actions, and more particularly, to recording, editing and reproduction of a user web browser session or, more broadly, a user session while working with an application on a desktop or laptop computer.

Description of the Related Art

Large parts of human lives are increasingly lived online, and people often want to remember some aspects of their online lives by saving their interactions with a web browser (or, more generally, their interactions with an application on a desktop/laptop computer). When a person makes a recording of his online experience, it is natural to expect to edit such a recording, either for storytelling or for improved future communications. A conventional recording can be implemented by a video screen capture. However, it does not allow for editing recordings of a web browser session at a desired level of detail. While two types of recording can be used—see FIG. 1, none of the existing means can capture every element and interaction with a web page and allow for modification and editing before playback, preserving hypertext links so the viewer can follow links by clicking during playback, and modifying any element or interaction, something that is not possible with the video screen recordings.

It is desired to have any element on a page to be replaceable and to have any interaction deleted or changed, allowing unlimited changes to the recorded web browser session. It is also desired to have recordings stored for individual playback on demand. A user may want to broadcast recordings simultaneously to large groups of viewers, or to live stream the recordings at the time of recording. Prior to playback, or during live streaming, elements of a web page can be replaced by clickable and interactive content or ads, which can be personalized for groups or individuals based on data available to the playback software. However, these features are not provided by conventional video recordings.

There are several software tools that are used for user experience research and testing. The conventional tools monitor user interactions with a web site. These tools for "customer experience management" are used by the developers of a website to monitor use of a website by website visitors, typically to improve the usability of a website or increase revenues from consumer purchases on a website. These software tools must be installed by the developers on their own websites. Some of these software tools monitor requests from web browsers to web servers, and others use the browser API to monitor user interactions such as clicks on links.

These software tools are used for gathering data about large numbers of people visiting websites, and the data is often presented in the form of heatmap charts or summary tables. Among the tools used for customer experience management are tools for "session replay." Session replay is the ability to replay a visitor's journey on a web site or within a web application. Replay can include the user's view (browser or screen output), user input (keyboard and mouse inputs), and logs of network events or console logs. Its main purpose is to help improve customer experience, studying web site usability and customer behavior. Most tools that provide session replay rely on video screen recording of web browser sessions. Some advanced tools use the browser API to record data about user interactions with a web page.

There are key differences in both technique and purpose between tools used for customer experience management that also access the browser API. First, tools used for customer experience management are installed by web developers only on their own site. The tools only can be used to record and replay visits to the developers' own site. In contrast, it is desired to record and replay visits to any website. Second, tools used for customer experience management save data in a form designed for aggregate analysis and research. In contrast, it is desired to save data in a format that allows a web browser session to be edited before being replayed.

Conventional means cannot capture, edit and playback a web browser session with a desired level of detail or interaction. Accordingly, a system and method for recording, editing, and reproduction of web browser sessions for entertainment or instructional purposes (and not just for analysis of customer behavior) are desired. It is also desired to be able to create entertaining or instructional narratives using the web browser itself as a medium, instead of recording on-screen interaction as a video.

SUMMARY OF THE INVENTION

Accordingly, the present invention is related to a method and system for recording, editing and reproduction of a user web browser session or, more generally, a user session while working with an application on a desktop or laptop computer, that substantially obviates one or more of the disadvantages of the related art.

In one embodiment, a method and system for recording, editing, and playback of web browser sessions, which captures a series of user visits to web pages, including the initial state of each page and all user interactions with the web pages, are provided. An application uses a web browser's native API (application programming interface) to record and store web pages and user interactions in a unique data format, not as video. Unlike video recording of a computer screen, using the browser's native API for recording makes it possible to edit the recording of the user's web session, modifying the recording in ways that are not possible with video recording. The recorder application includes a core engine implemented in JavaScript (the browser's native programming language, which can be built into a web browser or added as a browser extension) plus various server configurations, either local or remote, for playback. The recordings can be used for entertainment or instructional purposes.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 4 illustrates a diagram depicting a unique data format used in web browser recording, in accordance with the exemplary embodiment;

Figure 6:
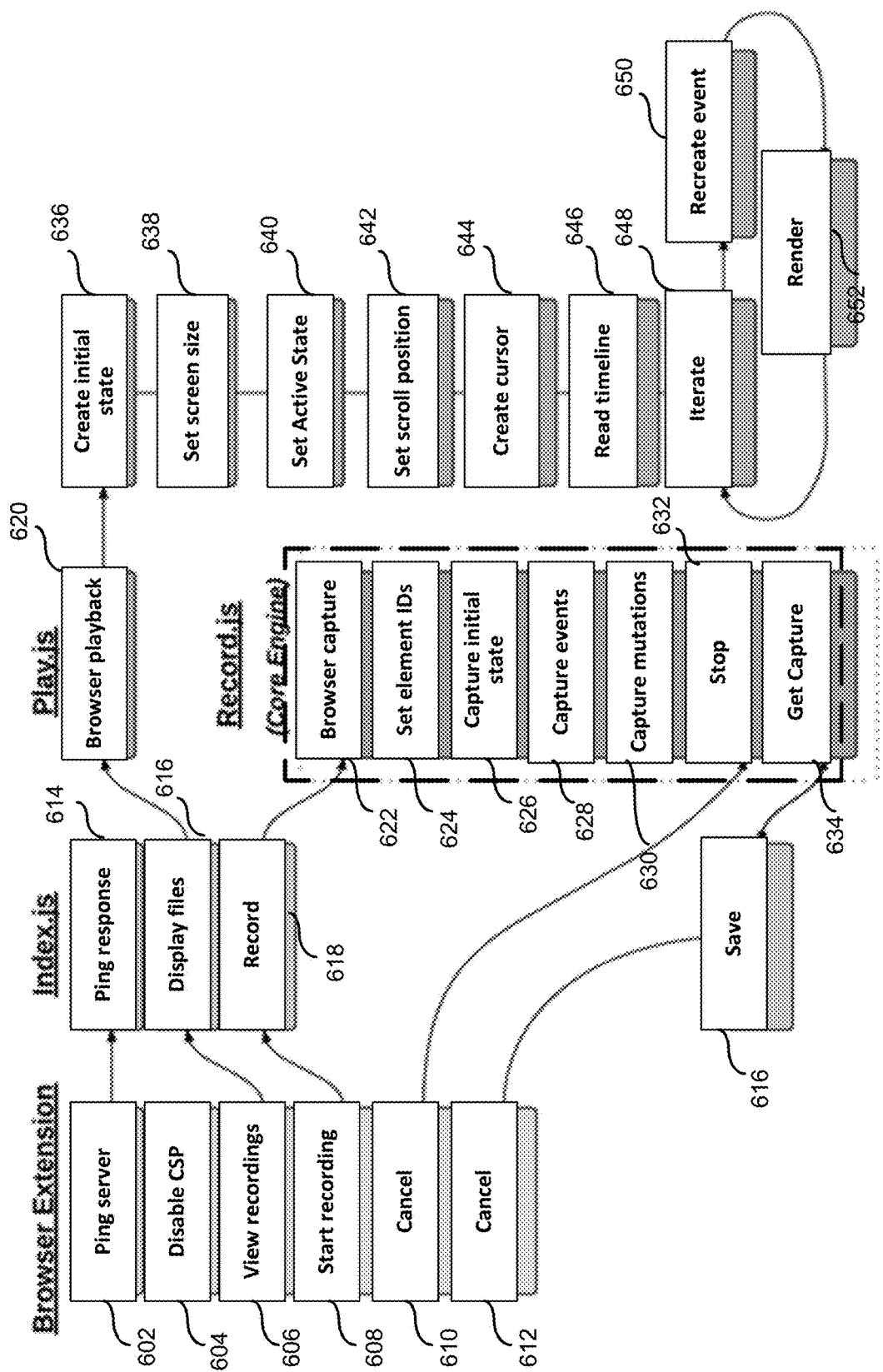
Figure 7:
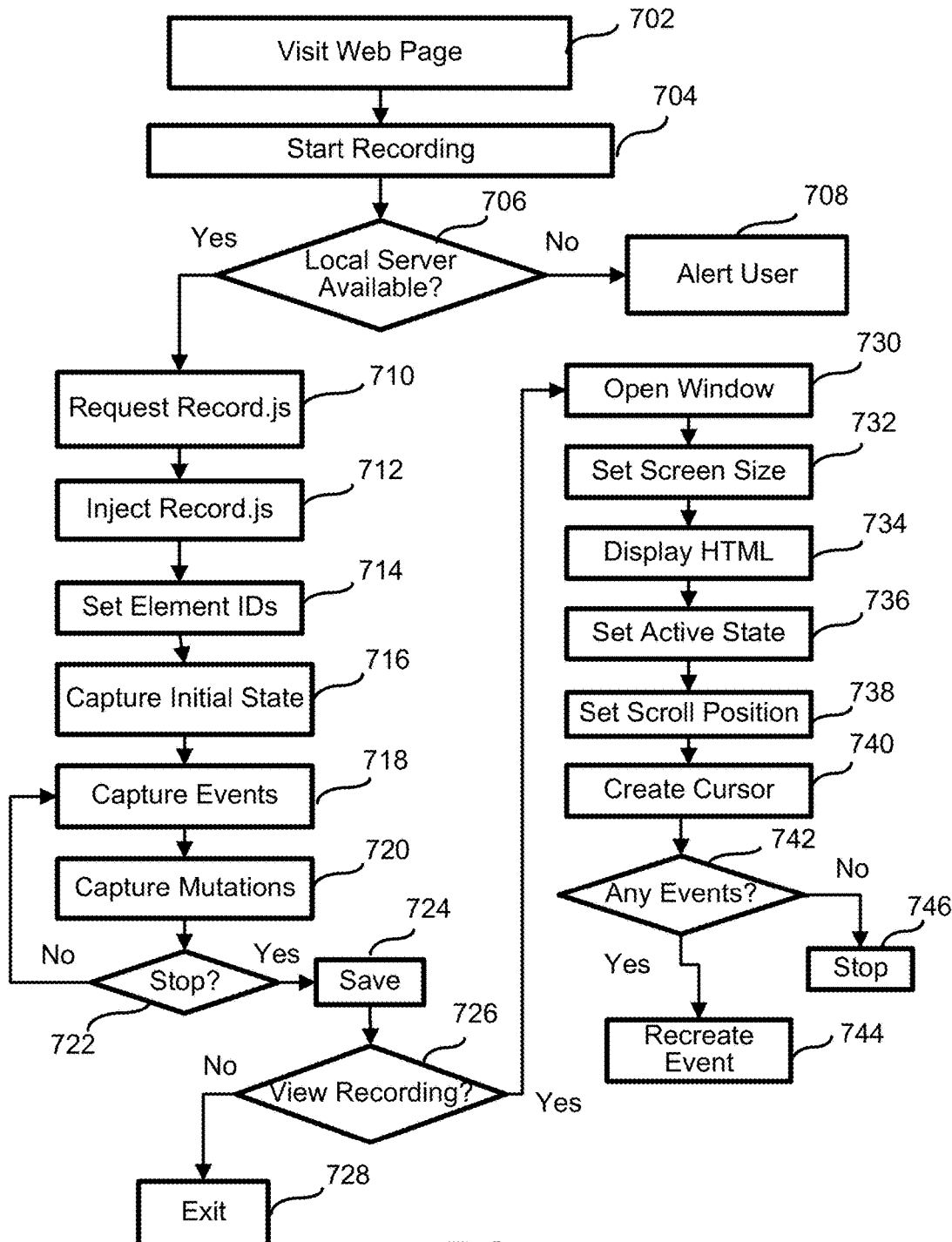
Figure 8A:

FIG. 5. depicts the files provided by the exemplary embodiment;

FIG. 6 illustrates architecture of the exemplary embodiment;

FIG. 7 illustrates a flowchart of a method, in accordance with the exemplary embodiment;

FIG. 8A illustrates a browser page with a recorder application installed and running (see round button at the upper right corner).

Figure 8B:
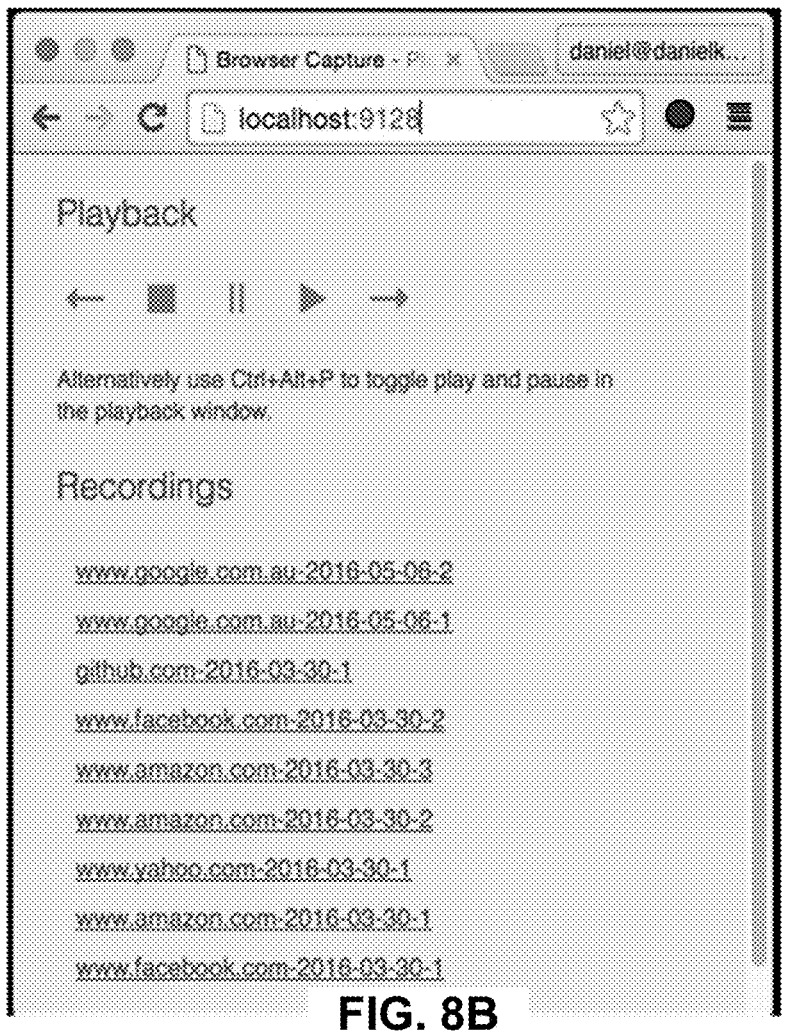
Figure 9:
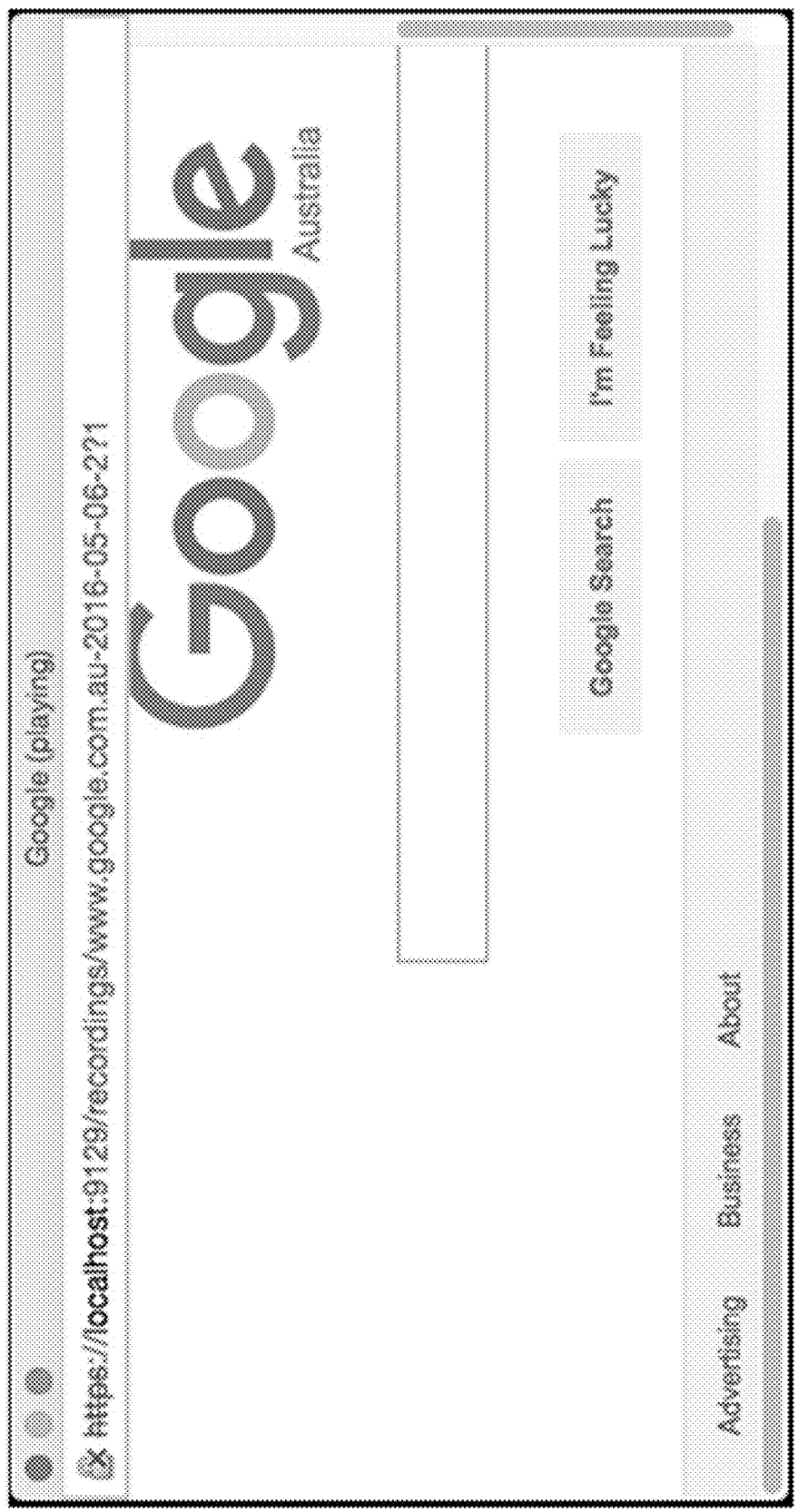
Figure 10:
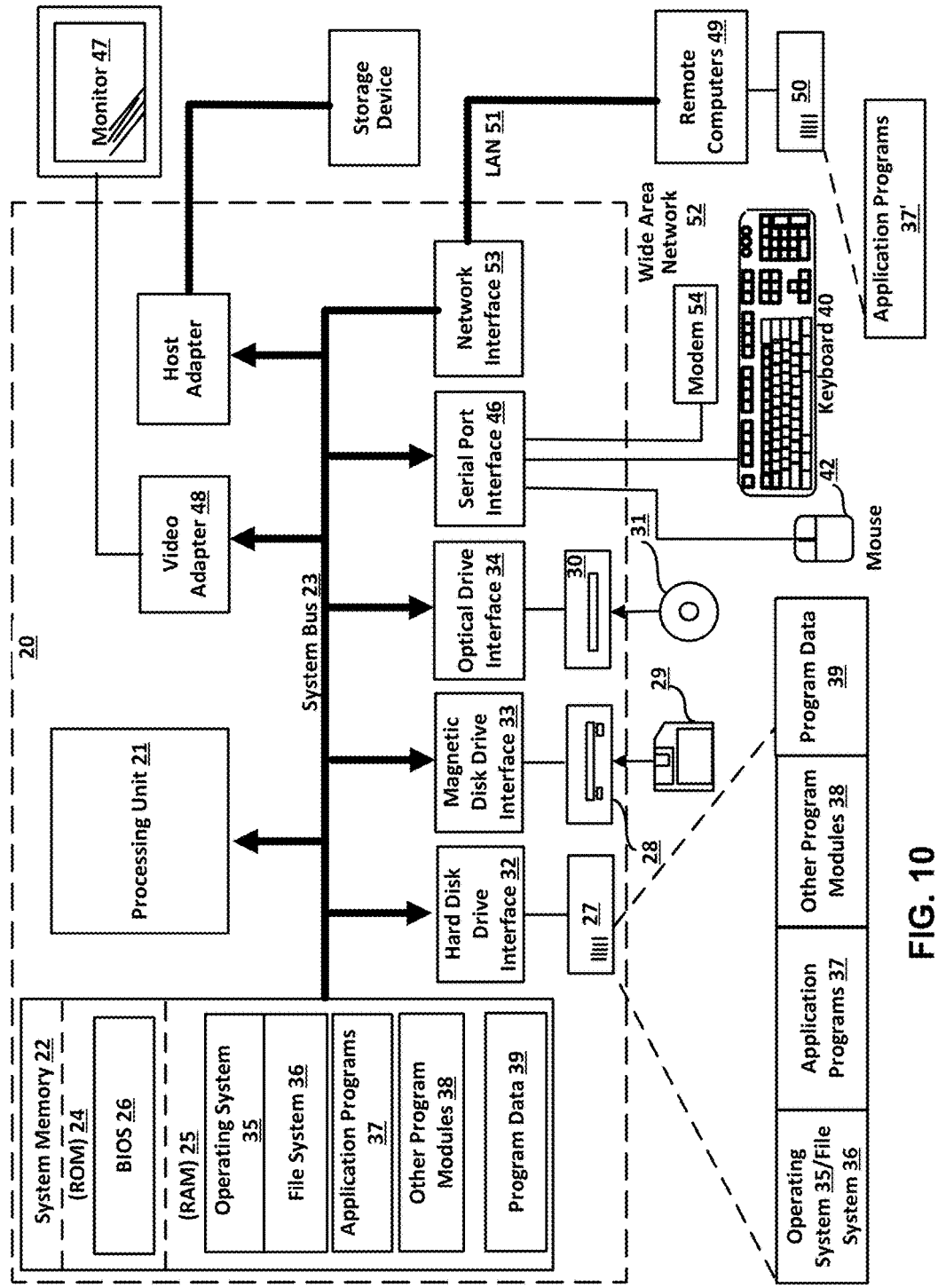

FIG. 8B illustrates a browser page displaying a playback window with available recordings;

FIG. 9 illustrates a screenshot of a recorded page being played from a local host;

FIG. 10 illustrates a schematic of an exemplary computer or server that can be used for implementation of the invention.

FIGS. 11, 12A, 12B, 13, 14, 15A, 15B, and 16 show exemplary screenshots illustrating the concepts described herein.

DETAILED DESCRIPTION OF THE PREFERRED EMBODIMENTS

Reference will now be made in detail to the preferred embodiments of the present invention, examples of which are illustrated in the accompanying drawings.

In one aspect of the invention, a method and a system for recording, subsequent editing and reproduction of a user web browser session or, more broadly, a user session while working with an application on a desktop or laptop computer, is provided.

In one embodiment, a browser extension (plugin) and a local web server are configured to record and to store user interactions with a webpage. The browser extension is used for recording. The browser extension is installed in the web browser (e.g., Google Chrome™). The exemplary embodiment can also be implemented as a browser extension for other web browsers such as Safari, Firefox, Edge, Opera and Internet Explorer. The browser extension comprises a software code written (in this example) in the JavaScript programming language. A core engine captures the initial state of a web page and every interaction of a user with the web page. The initial state of the page and each interaction event is captured as data and saved with a timestamp to an event stream. The event stream is stored as a file in a unique data format. Alternatively, the data stream can be saved to a database. The event stream contains all the data needed for the playback server to reproduce the user's web browser session.

The event stream is stored using the JSON (JavaScript Object Notation) data exchange format. JSON provides a common syntax for arrays of data attributes. The exemplary embodiment defines a consistent format for storing web browser recordings using JSON. The data format is unique to the exemplary embodiment. Each web page visited during a web browser session is an item in a JSON array. Each item in the array is represented by an object that describes the initial state of a web page plus a timeline array that stores a sequence of events with timestamps.

Each web browser (Google Chrome™, Apple™ Safari™, etc.) implements the W3C DOM4, that is, the specification of the browser Document Object Model from the W3C Web Hypertext Application Technology Working Group, which is referred to as the "browser API." The core engine captures the initial state of a web page by traversing the web page Document Object Model (DOM), which is available through the browser API. Before the recorder captures the initial state of a web page, the process ensures that every page element is assigned a unique identifier. Then, the process iterates through each element, serializing the HTML in a format, which can be stored and reproduced. The serialized HTML is stored in the JSON array and contains everything needed to reproduce the page. Each time the user visits a web page, the recorder application captures and stores the initial state of the web page.

"Web scraping" is a common technique for capturing and saving data on a web page, typically, with the intent of extracting data from the page. When the core engine captures the initial state of a web page, the "web scraping" technique is used, but the web scraping is used to store and reproduce the web page as a "key frame" in a recording. The exemplary embodiment assigns a unique identifier to each page element and saves the serialized HTML in a unique data format that allows for reproduction of the page during playback of a recording.

When the core engine saves the initial state of a web page, it uses the browser API to traverse the Document Object Model (DOM) using a technique similar to web scraping. Although a browser API is used, the purpose is different from a common web scraping, because the recorder captures and stores web pages so they can be reproduced during playback of a recording of a web browser session.

The initial state of a web page is stored with attributes such as screen width and height, a URL, and a complete record of the web page's HTML code. It is stored as an object in the JSON array with the following attributes:

a URL of the visited web page;
an HTML of the web page;
Attributes of the web page HTML tag (such as language);
Browser screen width;
Browser screen height;
Active Element (element receiving focus); and
Initial scroll position of the page.

After capturing and storing the initial state of a web page, the core engine enters a "listening and watching" mode to record every interaction of the user with the web page. The core engine uses the browser API to observe user interaction events. The browser API provides JavaScript methods to watch for events, specifically a MutationObserver and various event listeners. Typically, web developers use these methods to add interactivity or additional functionality to a web page. For the purpose of the exemplary embodiment, these JavaScript methods are used to observe user interactions so the recorder application can record and reproduce the web browser session.

Timeline events are described with a timecode, type (such as mouse move or scroll event), and position coordinates relative to the left edge and top edge of the browser window. When "listening and watching," the core engine captures the following user interactions using event listeners:

Mouse events (mouse move, mouse down, mouse up);
Page and element scroll events;
Entering text in an input box;
The value of an input box being changed; and
Focus and blur events.

In addition to these events, the core engine monitors and records changes to DOM nodes (using the browser API MutationObserver object) such as:

Additions and removals of child nodes;
Additions, removals, and changes of attributes; and
Changes to child text node values.

Using event listeners and the MutationObserver object, the core engine captures all user interactions in the web browser. Each interaction or change of a page state is saved as an item in a timeline array. Each item is assigned a "time" attribute in microseconds (or milliseconds, or some other unit of time) measuring the elapsed time since the previous event. The exemplary embodiment uses a relative time for each event, rather than a clock time, which makes it easier to record the sequence of events during the editing process. Each event in the timeline is described by the following attributes:

Time;
Type (such as mouse move or scroll); and
ID.

If the event is a change to DOM attributes, the core engine records the following attributes:

Time;
Type ("attributes");
ID;
Attribute name; and
Attribute value.

If the event is a change to text within a DOM text node, the core engine records the following attributes:

Time;
Type ("characterData");
ID; and
text.

If the event is interaction with video on the page, the core engine records the following attributes:

Time;
Type ("video");
ID;
Timestamp (current time); and
Source (a URL for a video source).

The purpose of the core engine is to capture the initial state of the web page and any user interactions and constructing the timeline array in memory. In its simplest implementation, the core engine provides a simple API to start, stop, and restart the recording process. A "getCapture" function returns a JSON array containing the initial state and the timeline of events.

The core engine is accompanied by additional functions that support integration of the core engine with a browser bookmarklet or a browser extension. A bookmarklet is a JavaScript code that is installed as a bookmark or favorite in a web browser, adding a "Record" button as a favorite and providing a simple interface for initiating recording of a web browser session. A browser extension provides a full-featured user interface. The browser extension adds a control (and indicator) to a corner of a web browser. When it is first installed, the control is a simple gray or black circle. The control is also an indicator to show whether a session is being recorded. The user clicks on the control (the gray circular button) to view the browser extension user interface. A local server must be available to store and playback the recording. If the server is not running, the user sees a message, "Playback server not running." If the server is running, the user sees a message, "Server available." The user can click the button to "Start Recording." The indicator (the circle) briefly turns yellow to indicate the recording software is loading. Then, the indicator turns red to indicate that all browser events are being recorded.

During recording, every mouse movement and interaction with the page are recorded. If the user clicks a link to visit another page, the indicator turns yellow while the new page loads, indicating the recording has paused while the new page is retrieved. The indicator turns red and the recording resumes as soon as the new page is loaded. The user can click the red indicator and press the button "Save Recording" at any time. The user will see a message and a link, "Saved. View saved recording." The user can click the link to open and view a recording. The user can click the link "View Recordings" to see the server user interface page with a list of previously saved recordings.

The browser extension contains a feature to disable Content Security Policy (CSP), a security standard that prevents cross-site scripting (XSS), clickjacking and other code injection attacks resulting from download of malicious content. Some websites (notably Facebook and Twitter) enable CSP and the browser extension offers a checkbox to configure the browser to ignore the CSP security settings. The bookmarklet and browser extension integrate the core engine with any web page through a JavaScript injection technique. A JavaScript injection provides access to the DOM of any visited web page by inserting a JavaScript file from the local computer into the visited web page. Either a bookmarklet or a browser extension can obtain a local JavaScript file and add it to any web page displayed in the browser.

The exemplary embodiment implements the core engine as a JavaScript file. The JavaScript file is available on the local computer as a part of the browser extension. The browser extension injects the local JavaScript file containing the core engine whenever a user initiates recording and visits a new web page. The browser extension provides a user interface and manages operation of the core engine with function calls to start recording, pause recording, and save the event timeline. The browser extension periodically checks to determine if a local web server is available for saving files and for playback. If the connection to the local server is lost, the browser extension displays an error message.

A local web server is used for saving files and for playback. A "node.js" JavaScript runtime or similar is required and must be available on the user's computer before the local web server is installed. The local server can be implemented in the JavaScript programming language as a single JavaScript file. The local web server responds to both HTTP (insecure Hyper Text Transfer Protocol) and HTTPS (secure Hyper Text Transfer Protocol) requests. When recording web pages requested with ordinary HTTP, the browser extension requests the local JavaScript file using HTTP. When recording HTTPS, the browser extension makes a secure HTTPS request to obtain the local JavaScript file. In order to respond to the secure HTTPS request, a self-signed SSL certificate accompanies the local web server. In the simplest version of the exemplary embodiment, the user starts the local web server from the computer's command line.

The local web server listens for requests from the browser extension. It responds to periodic ping requests to inform the browser extension it is available and listening. In the simplest implementation of the exemplary embodiment, it responds to the browser extension's request to save a recording by saving a file to the computer file system. In more complex versions of the exemplary embodiment, the local web server can save the event timeline to a database instead of the file system. After saving event timelines as files, the local web server can display a web page showing a list of all recordings. Clicking the filename of any recording opens a new browser window and begins playback of the recording. The HTML file delivered for playback includes the initial state of the original web page plus a link to a JavaScript file that implements playback. The HTML playback page includes the event timeline needed to reproduce the user interactions.

The JavaScript file that implements playback includes a main class "browserPlayback." The main class contains functions that respond to user requests to play, pause, or stop playback. A request to play calls is a function that recreates the initial state of a recorded web page. The function sets the dimensions of the browser window, reproduces the page, scrolls the page to the initial position selected when recording began, and sets the browser focus to match the focus state when the recording began.

The exemplary embodiment defines a format for an event timeline that contains both a time code and a numerical identifier for each recorded event. The time code records the elapsed time in microseconds since a previous event. The use of a sequential numerical ID with the elapsed time allows for editing and re-sequencing events or blocks of events. The playback script creates an ID table, so each timeline event is replayed in the correct sequence. The elapsed time attribute controls the scheduling of the display of each event, so both the sequence and duration of the events is reproduced correctly.

The playback script contains a "render" function that is triggered by a play request. The render function reads an array of events ("frames") and uses a browser API function "requestAnimationFrame" to update the web page with each recorded event. The requestAnimationFrame API function is commonly used to implement animated effects on a web page. The exemplary embodiment uses requestAnimationFrame for the purpose of updating an initial web page to reproduce user interactions from a recorded web browsing session. Each type of recorded user event must be rendered differently so the playback script contains functions to correctly render each type of user interaction. The playback script creates a simulated cursor that is used to reproduce the appearance of mouse events such as mouse movements.

Many applications are available for capturing and recording the video display of a computer screen. They use the computer's operating system to capture the video sent to the computer display. The result is the same as recording the computer's display with a video camera. The recording is a video file in a format such as MP4. The video recording can be cut and spliced, rearranging the sequence of recorded events. Specialized software can be used to edit individual frames of the video recording, pixel by pixel, in a labor-intensive process that is the same as the processes used for computer graphic effects in films. Though the video image may have the illusion of depth, with overlapping elements on the screen, the video recording is a single layer and only the pixels can be edited.

Figure 1:
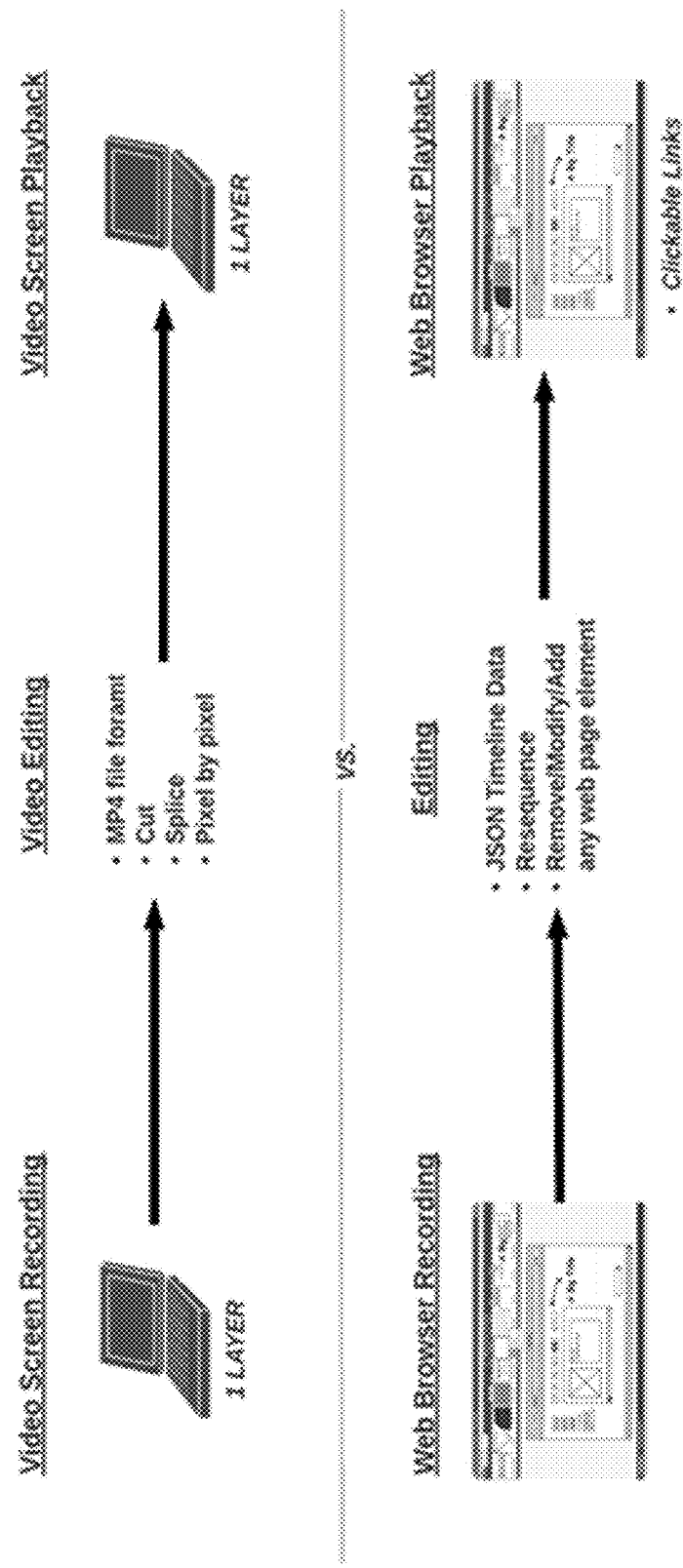
FIG. 1 illustrates a conventional schemas for recording user actions.

As shown in FIG. 1 (bottom portion), the preferred embodiment is directed to web browser recording (vs. video screen recording), which uses the browser API to capture some or all elements on a web page and some or all user interaction with the web page. Typical uses of the API are monitoring user interactions to obtain data from a web server or modify the web page itself. The browser API also can be used to monitor and record user interactions. Typically, this is done by a web developer, who seeks to observe and analyze visitor behavior on the developer's own site for the purpose of improving usability of the website. The exemplary embodiment uses the browser API to record user interactions in a form that can be edited before replay for the purposes of instruction or entertainment (e.g., capturing it because it represents a scene in a movie).

According to the exemplary embodiment, web page elements and interactions are stored as textual data in a timeline format using the JSON standard. Every element and interaction can be identified, modified, moved or deleted, allowing the recording to be modified as if it had many layers. On playback, the reproduced browser session contains actual web pages with links that can be clicked and followed to new web pages. On playback, the playback server reproduces the browser session in its entirety, including visits to web pages initiated during the original recorded session.

This means that without editing, the viewer will see the same sequence of web page visits as seen by the user making the original recording, replicating the browser session with a seamless transition from web page to web page as seen by the original user. Unlike viewing a video, the web browser session is reproduced in a web browser, which means that the user viewing the playback can click a link in the browser playback window at any time and a new browser window opens displaying the linked page. All links are live during the playback, which means the viewer can click any link in the playback window to open a new window, in addition to simply watching transitions from page to page as recorded by the original user.

Figure 2:
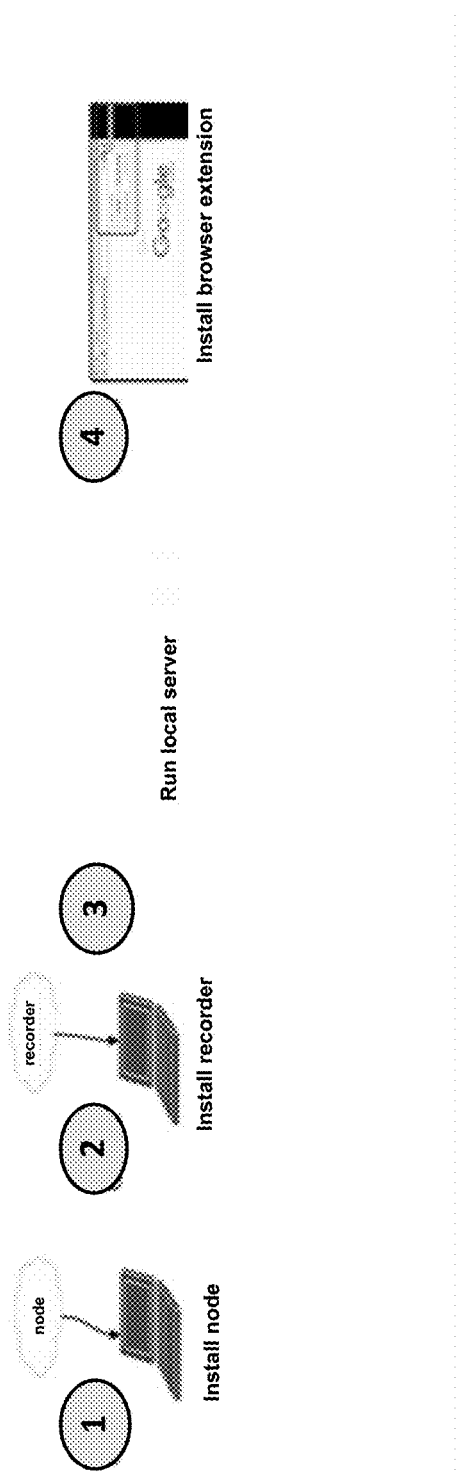
FIG. 2 illustrates how the recording application is installed and used.

FIG. 2 illustrates how the recording application is installed and used. As a first step, a node must be installed. The node is a module, which interprets and executes JavaScript programs. The exemplary embodiment is implemented a package of executable JavaScripts. As a second step, the recording application is downloaded and installed on the user's computer. In the third step, the user enters a command in the computer's terminal or console to start a local web server. In the fourth step, the user installs the proprietary browser extension in the web browser. The browser extension provides a user interface for recording and playback of web browser sessions. The "Node.js" software program is an open source utility, which interprets and executes JavaScript programs independent of a web browser. The exemplary embodiment is implemented as a package of executable JavaScript programs and the "Node.js" software program is required to execute the JavaScript programs.

Additionally, FIG. 2 illustrates the dependencies and components of the exemplary embodiment. "Node.js" is a dependency. The exemplary embodiment includes a local web server and a browser extension configured to record user interactions with a webpage. A sequence of installation of different software packages is performed. First, "node.js" is installed. Then, the recording application is downloaded. Next, the user starts the local web server. If the node.js is not installed, it is normally not possible to start the local web server. Then, the user installs the browser extension in the web browser. The browser extension provides a user interface for recording and playback of web browser sessions. However, the user cannot normally record a web browser session unless the node.js is installed and a local web browser is running.

Figure 3:
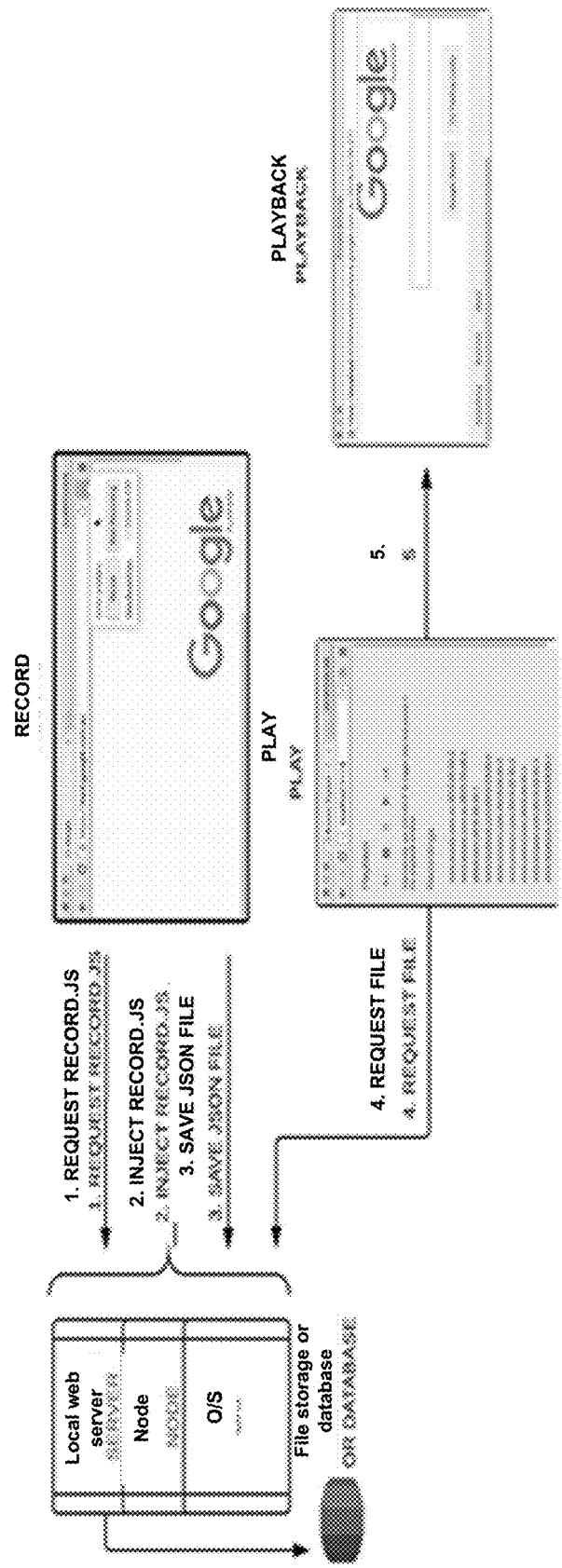
FIG. 3 illustrates a user interface and a process flow, in accordance with the exemplary embodiment.

FIG. 3 illustrates a user interface and a process flow, in accordance with the exemplary embodiment. The exemplary embodiment contains a local web server, which is installed above the "Node.js" software program and the JavaScript runtime engine, which is installed above the computer's operating system. The local web server can access the computer's file system or a database for persistent storage. From the user interface, which is available as a browser extension, the user can click on "Start Recording," which requests the "record.js" file from the local web server (Step 1) and injects it into any web page that is visible in the browser (Step 2). The initial state of the web page and any user interactions is captured by the exemplary embodiment. When the user clicks "Save Recording," a timeline file in the standard JSON format is sent to the local web server and saved to the file system or a database (Step 3).

In one embodiment, the recording is saved as a file on the user's local computer. In another embodiment, the recording is saved to a database server application running on the user's local computer. Finally, it is possible to save the recording to a remote server, either as a file or stored it in a database.

When the user clicks "View Recordings," the browser extension makes a request to the local web server and a web page is displayed with a list of available recordings. Clicking any link to a recording (Step 4) requests the local web server to generate a web page containing the initial state of the recorded web page, with an embedded "play.js" file and an event timeline. A playback window opens (Step 5), displaying the initial state of the recorded web page, and the user can watch playback of all recorded user interactions.

Note that the capability of recording, editing, and playback of web browser sessions is new and novel. Use of the web browser is significant in almost everyone's life, but before it was not possible to record, edit at a detailed level, and playback web browser sessions. The exemplary embodiment, advantageously, provides for creative use of web browser recordings in ways that were not previously possible. For example, it is possible to create fictional narratives based on recording and editing web browser sessions. Just as video and film recording can be used to make motion pictures, or audio recording can be used to make radio dramas or podcasts, the exemplary embodiment can be used to make stories that are played in the web browser.

FIG. 4 illustrates a diagram depicting a data format used in web browser recording, in accordance with the exemplary embodiment. The recording is implemented as a textual data organized using the standard JSON data syntax. The recording is a JSON array comprising of one or more objects representing each web page visited during the web browser session. Web browsers record a browsing history as a list of URLs of the web pages that a user has visited. The exemplary embodiment does much more than simply record a list of previously visited web pages. Each web page is captured in its entirety, including all HTML used to create the web page, so the web page can be recreated exactly as it was seen, even if the web page is later changed by the website owner. That is, the web page is archived by the recorder.

During the recording, each web page visited by the user is archived in its entirety so it can be reproduced during playback. Each web page object contains an object comprising attributes that describe the initial state of the web page plus an array, which represents a timeline of user interactions or events that modify or transform the page. Note that during any web browsing session, actions by the user can modify the web page within a set of options provided by the web developer. For example, the website developer can give the user an option to open a chat window to send a message.

The exemplary recorder can capture the user's action and the resulting web page modification. If the user selects an option to open a chat window while recording, the recording reproduces the user's action and show a chat window opening. The recorder can capture, record, and reproduce any user interaction with a web page. The data recording format makes it possible to modify any recording. For example, the user can edit the data file and change the words displayed in a chat window. The initial state of the web page is described with attributes such as the URL of the visited web page, attributes of the web page HTML tag, screen width and height, any element receiving focus, and the initial scroll position of the page. Each timeline event is assigned a type, ID, and a timecode, as well as attributes specific to the type of event.

The attributes that describe the initial state of a web page are, for example:
  Screen width—1198 (pixels);
  Screen height—591 (pixels);
  URL—https:***github.com/Storistream/browsercapture;
  Scroll position—100 (pixels);
  Active element—132 (element ID); and
  HTML—(web page HTML).
The attributes that describe a user event are, for example:
  Type—mouse move;
  ID—323 (sequential integer);
  Time—969 (microseconds).

The type is obtained from the browser API. IDs are assigned sequentially starting with the first element on the page. The time is calculated as a duration in microseconds since the previous event.

Depending on the type of the event, the event may have additional attributes, such as the ones for "mousemove":
  Left—1022 (pixels from left); and
  Top—66 (pixels from top)

FIG. 5 depicts the files provided by the exemplary embodiment. The Playback Server folder includes the files required for the local web server. The "Index.js" file implements the local web server in JavaScript requiring JavaScript software libraries for HTTP, HTTPS, and access to the file system. It requires prior installation of the Node JavaScript runtime. The "Cert.pm" and "Key.pm" supply a self-signed SSL certificate for HTTPS access to the server. The "Play.js" file implements the playback function. It is combined with HTML for the initial state of a web page and reads and renders the timeline data to reproduce the web browser session. The Record-Extension folder contains the files needed for the browser extension. The "Background.js" file contains the code that is installed as a browser extension. The "Popup.html" and "Popup-script.js" files implement the user interface that is displayed by the browser extension. The "Record.js" file contains the core engine that is injected into a web page to enable recording. Files in the Recordings folder are the actual web browser recordings in the JSON file format.

FIG. 6 illustrates architecture of the exemplary embodiment. The Browser Extension provides a user interface for controlling recording and playback. The Browser Extension periodically pings (602) the local web server to determine if it is available for recording and playback, sending a request to the "Index.js" script, which responds to a ping request. The Browser Extension contains a checkbox, which disables a web page's Content Security Policy settings to enable JavaScript injection.

A "View Recordings" link 606 sends a request to the "Index.js" script to display a web page listing previous recordings. A "Start Recording" link (608) makes a request to the Index.js script to obtain the "Record.js" script for injection into the web page. A "Cancel" button 610 sends a request to the "Record.js" script to stop the recording (632). A "Save" button 616 sends a request to the "Record.js" script to stop the recording (632) and provide the event timeline to the Index.js script to be saved in the file system or database.

The "Index.js" script is the local web server. It can respond (614) to the browser extension's ping request. It can respond to a request to display a web page containing a list of previous recordings (616). It can respond to a request to record by providing the "Record.js" file to be injected into a web page for recording. The "Record.js" script contains all the functions of the core engine for capturing the initial state (626) of a web page and all user interactions and page mutations (630). The main Browser Capture function responds to a request to record by capturing the initial state (626) of a page and all user interactions and page mutations (630). As a first step, all DOM elements are assigned a numerical identifier (624) to aid in reproducing the page. A function captures the initial state of the page as serialized HTML. Then, the core engine begins listening for user events and observing DOM mutations. The core engine continues listening and observing until it receives a stop request (632). If the core engine receives a request to save a recording (616), a Get Capture function returns a JSON array containing the initial state of the page and the event timeline in a format ready to be saved to the file system or a database.

The "Play.js" script is embedded in an HTML file generated by the "Index.js" script when the user makes a request to playback a recording. The main function is named Browser Playback (620). It reproduces the initial state of a web page (636), sets the browser dimensions (638, 644), sets the active focus (640), sets the scroll position (642) and creates a simulated cursor. Then, the Browser Playback function reads the event timeline (646), iterating (648) through each event in sequence as determined by the ID table. The Browser Playback sets up the animation required to reproduce the event (or mutation) (650) and render the event in the browser (652).

FIG. 7 illustrates a flow chart of a method in accordance with the exemplary embodiment. In step 702, a user visits a web page. Recording of user actions is started in step 704. If a local server is available in step 706, a "request record.js" script is executed in step 710. Otherwise, a user is alerted in step 708. In step 712, a script "Inject Recordjs" is executed. The element IDs are set in step 714 and an initial state is captured in step 716. Events are captured in step 718. Mutations are captured in step 720. If a stop recording is issued in step 722, the recording data is saved in step 724.

Otherwise, the process goes back to step 718. If viewing of the recording is requested in step 726, a window is open in step 730. Otherwise, the process exits in step 728. A screen size is set in step 732. HTML is displayed in step 734. The process sets active state at step 736. A scroll position is set in step 738. The process creates a cursor at step 740. If any event left in step 742, the process recreates the event in step 744. Otherwise, the playback stops in step 746.

FIG. 8A illustrates a browser page with a recorder application installed and running (see a round button at the upper right corner). The "start recording" dialog menu is also shown upon user clicking on the recording button.

FIG. 8B illustrates a browser page displaying a playback window with available recordings. A user can click on any of the recordings and playback the recording.

FIG. 9 illustrates a screenshot of a recorded page being played from a local host.

As discussed above, the main purpose of the exemplary embodiment is:

1) to record user activity and UI changes into a unique data format that contains UI elements and their properties;

2) to be able to replay the recorded data in the same manner as it was recorded;

3) to be able to edit each recorded element separately by changing its properties (time, length, size, color, text, etc.). One exemplary embodiment is directed to a browser session recording. Other embodiments can be implemented for recording user activities and UI elements of desktop/stand-alone applications in various versions of Mac™ OS and Windows™ operating systems. While some technology details may be different for each system/environment, the concept and idea of recording and playback remains the same. According to one exemplary embodiment, recording of desktop applications requires a unique data format. All application GUI elements are assigned unique IDs and all changes of the initial GUI window are recorded. All user actions that switch between the GUI windows and user operations with GUI elements are recorded and can be played back as well.

In an alternative embodiment, the concept is applied more broadly, to recording, editing and playback of user actions as they relate to a desktop application. To do this, a user records applications with a desktop recorder. The desktop recorder injects into a targeted application and listens to change events. The desktop recorder then parses the recorded data into a Layers format. This format uses a folder tree in accordance with an Object Model tree of the recorded application, where each class will represent a folder in the stored format. The recorded format is stored in the root folder (for instance Skype would be stored in com-.skype.skype). Each application folder contains folders with frame numbers. Each frame contains the hierarchy of objects being stored. An object is re-drawn in key frames, wherein its visuals may be repeated. Each object in the hierarchy contains metadata described in grabInfo.plist. Objects belonging to one of the four types will have a type field that can be image, graphics, text, or group. This works as follows:

An alternative embodiment is the recording that can be done by a web recorder (Chrome extensions, such as broadly described in this document). The stored format of the web recording are pdf files generated from the recorded html content. The desktop recorder converts pdf files into the format described below:

1. If the object is of image or graphics type, the folder may also contain a mask, e.g. mask.svg.

2. If the object is of text or apartText type, its metadata will contain the text itself in the text field, its allTexts.txt index in the textIndex field, and text parameters in the textStyle field. A text may have a variety of settings, which are applied to specified intervals, e.g. {x, len}, where x is the number of the first symbol, and len is the total number of symbols.

3. Also, if the object is a text, it may have the margins field, in which Left, Top, Right, Bottom text margins are listed (in the given order).

4. Font size and name may be specified in the textStyle field for each interval. If the field is empty, then the root metadata fields, such as fontName (fontPath) and fontSize, are applied to the entire text.

5. If the text uses a non-system font, a local path from the fontPath field will be addressed. All fonts, which are in use, are stored in Fonts, in the root folder. If there is no font in this folder, it means, it couldn't be identified. In this case, use any other font available.

6. The frame field contains object coordinates and size. Coordinates are relative to the object superview. For root Web objects, viewPort is also listed, in which case frame contains {0, 0, viewPort.w, viewPort.h}

7. Objects of group type are empty containers containing other objects. In the editor, they are used to group objects, e.g. if a child object is selected, its group object will be selected instead.

8. The zIndex field lists the index of the element on the superview. When objects are placed, they are sorted twice: first, by the parsed field, second, by the zIndex field.9.

9. The visible field is object transparency level, ranging between 0 and 1.

10. The interpolation field is used for interpolation of listed values. The field may contain the following keywords, but not necessarily: crop, frame, visible. Each value is listed in the {type, factor} format, where type can be 0 (no interpolation), 1 (linear interpolation), 2 (easeIn), 3 (easeOut), or 4 (easeInOut); and factor is the interpolation coefficient (reserved value, not implemented yet). In the editor, interpolation is applied from the previous key frame to the current one, i.e., if there is interpolation in key frame N, then interpolation will go from frame N−1 to frame N.

11. The crop field contains information about image cropping in the {left, bottom, right, top} format, with each value ranging between 0 and 1. left and right are the positions of vertical cropping lines, while top and bottom are the positions of horizontal cropping lines. For example, no cropping is coded as {0, 0, 1, 1}, i.e., left cropping line is at the leftmost edge (0), the right one is at the rightmost edge (1). If the object is cropped by half from the right side, it will be coded as {0, 0, 0.5, 1}

There are also other fields that can be used:
json
mediaBox (PDF content size)
wasRendered (whether the object has been rendered in this frame)
devName
parseMode
address
aoclass
name
baseFont
visibleFrame
frameName (current frame number—not for all objects)
lastChangesFrameName (number of a frame with any parameter changes—not for all objects)
lastVisibleRenderFrameName (number of a previously re-drawn frame—not for all objects)
backgroundColor.

Any object with .pdf extension is intermediate and should preferably not be used in xml generation.

The Mouse folder stores the mouse cursor. For each frame, a plist file is created that contains mouse coordinates, cursor type and size, and a flag indicating whether the mouse was clicked in that frame. All cursor movements recorded in the project are contained in the Mouse/Cursors folder. The session.plist in the project root folder contains some of the recording parameters:
fps (frame rate of the recording).
lastFrame (last recorded frame number).

As a further option, instead of storing everything directly in the memory, the data can be sent to the server portion by portion during recording). All changes in the MutationObserver of the DOM element are added into the object array as events, with each object comprising:
time since the previous event, in msec;
changed element ID;
change type: childList, attributes, characterData, input, change, focus, blur, videoplay, videopause, innerHTML, scroll, mouseMove, mouseDown, mouseUp, etc.
a new value or a new portion of HTML When the array has [n] elements (events) in it (n is a constant representing the number of events triggering the data transfer, in this case an exemplary n=300), a JSON file is generated and sent to the server along with its serial number. After that, the array is cleared and starts to accumulate further changes.

In its turn, the server identifies the user and stores the data in their account.

When the user stops the recording, the recorder sends all remaining data. After the server confirms that all the data have been received, a final JSON file is generated and sent to the server, where the final file includes:
initialState quantity (i.e., when moving to a new page, a new initial state is created, and the code of the new page is stored. Thus, the initialState quantity is the number of pages visited by the user);
number of JSON files in each initialState;
duration of each initialState;
total duration of the recording;
recording user ID;
recording title;
browser window dimensions during recording;
whether the recording was from the webcam (yes/no);
whether the recording was from a microphone (yes/no);
whether the sound was recorded from a tab (yes/no).

The server receives this data and stores it in the PostgreSQL database.

As a further option, video recording can be added to the recording (e.g., when the user visits YouTube or Facebook or similar sites). During recording, the recorder searches for video tags on the page and starts to follow their onvideoplay, onvideopause events. When a video is played back on the page, it creates a virtual canvas element, where the video content is copied every 40 msec. Then, using a standard toDataUrl method for canvas elements, it creates a JPEG image of the current video frame, which is then encoded into BASE64 format. The background attribute change event is created, with the current frame in BASE64 format assigned to the background attribute. JPEG is used in this example, since it supports compression, and the image data size is important, though PNG and BMP may also be used. BASE64 is used for encoding, since it can be embedded into HTML. Later, during editing, other videos can be inserted in place of the original video. It is possible to display the recorded collection of jpegs not only in BASE54, but also as a video stream when previously converted As a further option, map operations can be added to the recording, e.g., Yandex.Maps or Google Maps recording. During recording, the recorder finds a canvas element that contains a map in the DOM content using Yandex.Map class selectors (Yandex is used as an example here). Every 40 msec, the recorder creates a virtual canvas element and copies the map canvas contents there. Using the toDataUrl method, it creates a map image in JPEG format and encodes it into BASE64 format. The background attribute change event is created, and the current map image is saved.

As a further option, additional plug-in settings can be used. Recorder settings are stored with Chrome API and synchronized on various devices accessed by the user. The settings are read and saved using chrome.storage.sync. Also, the recorder follows the chrome.storage.onChanged event to monitor changes in settings. When the plug-in settings window is displayed, all media devices on the computer are found, permissible resolutions for webcams are listed, accessibility of webcams and audio recording devices is checked. All these lists are then included into drop-down settings menus. When a device is selected, its accessibility is checked again, and the user is notified of any errors. If there is a recording underway when changes in settings are being saved, the user is shown an error message notifying them that the settings won't be saved.

As a further option, PDF parsing can be applied. The server can parse HTML video into PDF files frame by frame using PhantomJS (a virtual browser without a graphic shell) and CasperJS (a plug-in for PhantomJS). When the user clicks on the Parse button, PhantomJS is run, and an initialState for the HTML video is created. The server reads data from JSON files, and after each frame it applies changes and then renders it into PDF via PhantomJS. When all PDFs are completed, the server packs them into a ZIP archive or similar, which can then be accessed and downloaded via a link.

As a further option, tab-based fast forward/rewind can be implemented. When the user clicks on the PREV/NEXT button or the tab icon on the timeline, both the current initialState number and target initialState are defined. A JSON file corresponding to the target initialState is requested from the server. DOM content is the cleared and filled with the received data, and the recording jumps to the target timestamp.

As a further option, timeline-based fast forward/rewind can be added. Each JSON file contains the current initialState. When fast forwarding/rewinding along the timeline, the target initialState number is defined, and the recording jumps to the current tab. The number of a new JSON file is requested from the server. After the new initialState has been rendered, the target timestamp is used to determine a position in this JSON file. Finally, all previous changes are applied and rendered, and the recording jumps to the current timestamp.

As additional options, webcam video recording can be performed, microphone sound recording can be performed, and tab sound recording can be performed. Camera and microphone can be accessed through MediaDevices.getUserMedia. Before the recording, recorder settings are read (camera resolution, user-selected camera detection, data amount) and sent to MediaDevices. A media data stream is created in the webm format (which is an open-source format by Google that is natively supported by Chrome and by other major browsers, and also allows to send data to the server in blobs, though other formats are also contemplated), which is then transferred in portions to the server via the socket.io connection. The server identifies the user and stores the media data on their account.

In order to play back the recording on a mobile device from the server, the resulting video file is converted from the webm format into mp4 with ffmpeg.

As a further option, a timeline added to the player, and a mobile player version can be implemented as well. The player shell uses VueJS framework with a component-based structure.

Recordings are played back using native JavaScript. Ajax-requests use jQuery to obtain data.

On the server side, the server can be moved from native NodeJS to Express, which makes it is more convenient for code support, has useful route settings, supports a variety of middleware; databases are easily plugged-in, and templates are conveniently integrated. A PostrgreSQL database can be used to manage user accounts and to store their recordings. Users are authenticated on the server with PassportJS, PassportJWT, PassportGoogle, PassportLocalSignIn, PassportLocalSignUp, ExpressSession. Passwords in the database are encrypted with BCrypt.

As a further option, in the additional embodiment of the recorder, there are two sections: the topmost section, where the user can customize what they want to record and set the resolution of the recording window, and the lower section, where they can view all recordings as a list and can delete, share recordings or proceed to editing of an HTML recording. When the user has finished recording, the window with the player is opened in a new tab, where the user can edit an HTML recording info and thumbnails of an HTML recording As a further option, auto-complete of the recording can be implemented. In one embodiment of the recorder, if the user clicked on an item in the auto-complete list, changes were not recorded. To address this, a handler has been added, which detects auto-complete on page and follows mouse clicks. When it is triggered, the auto-completed input is recorded. As a further option, the recording list can be changed to add video info: title, description, length. As a further option, buttons for PDF un-parsing and deletion can be added, and recording deletion can be added to the plugin.

Figure 11:
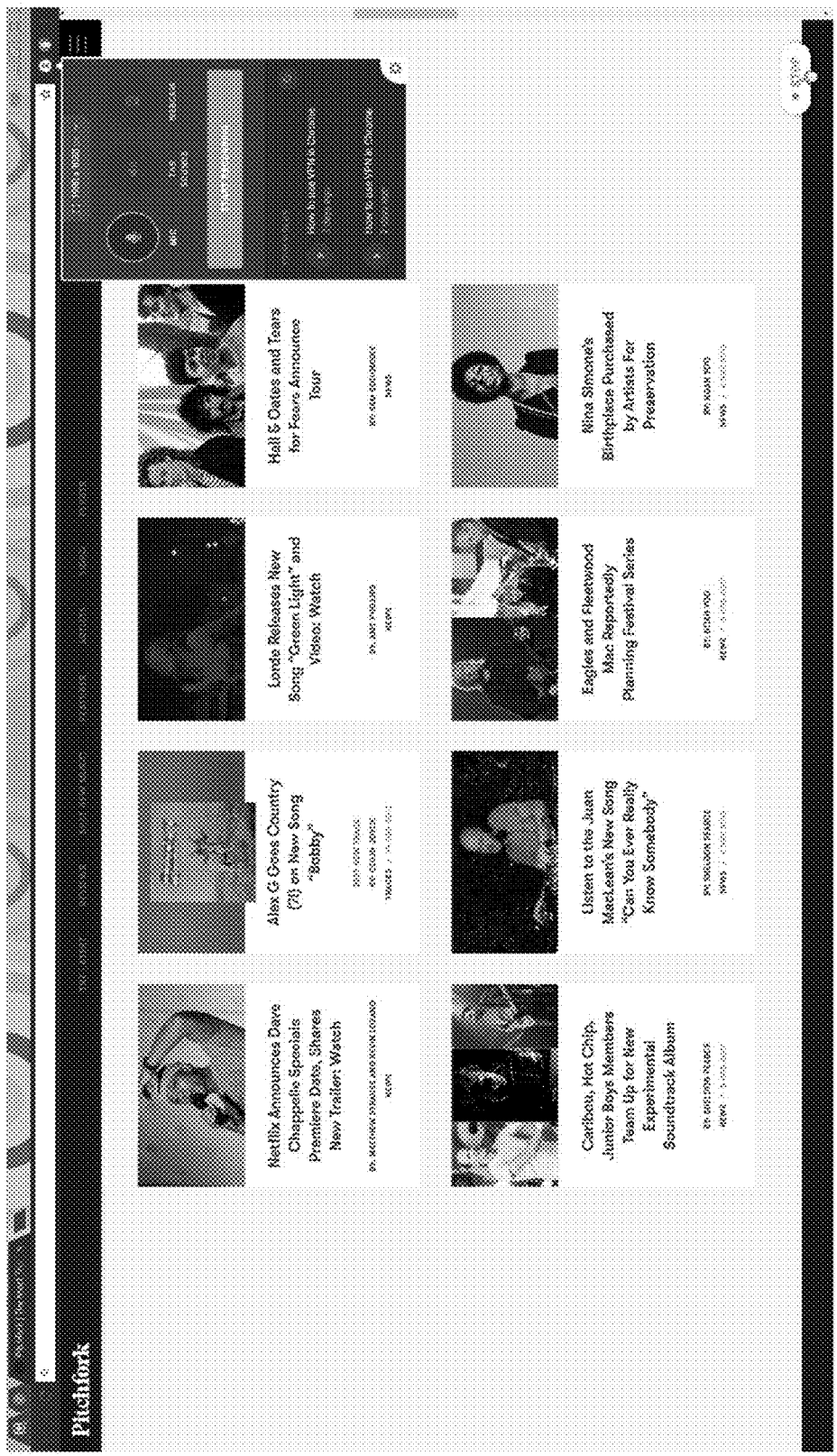
Figure 12A:
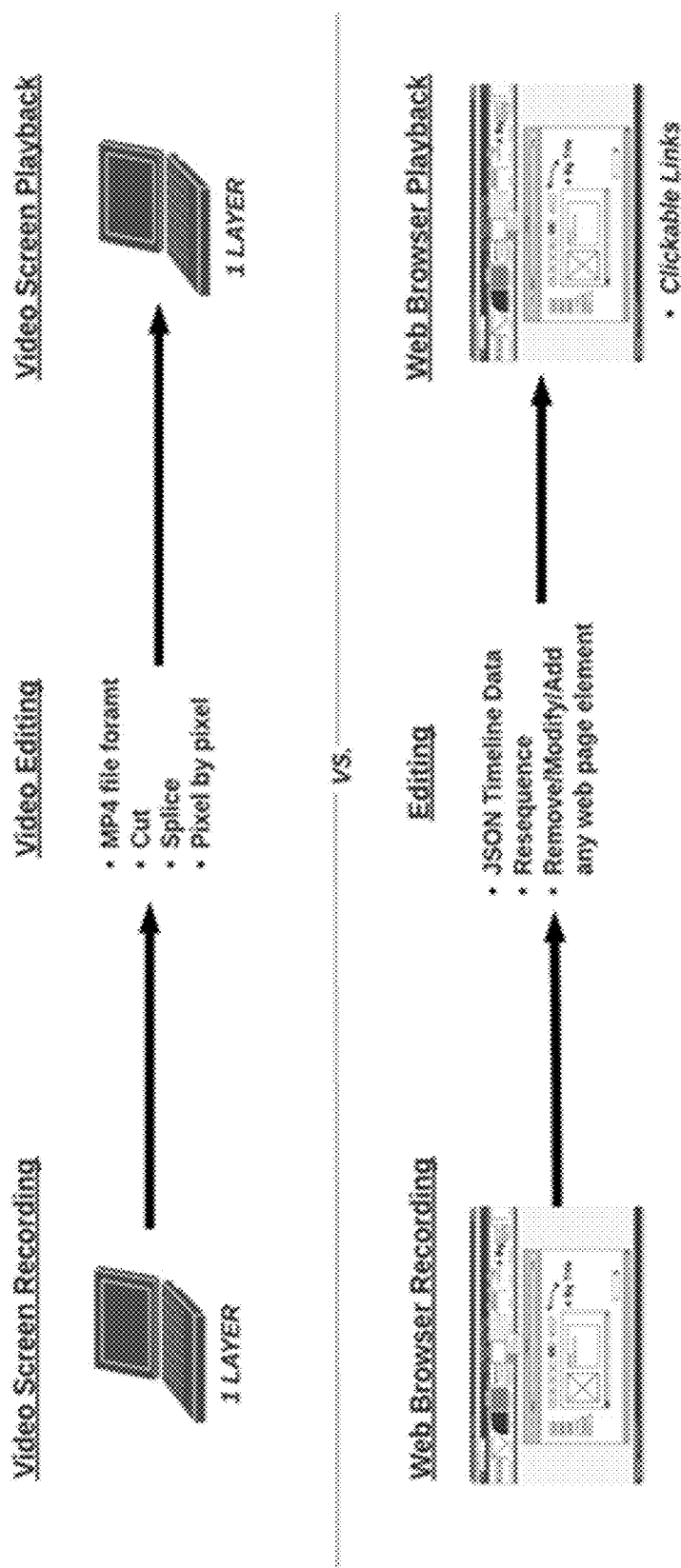
Figure 12B:
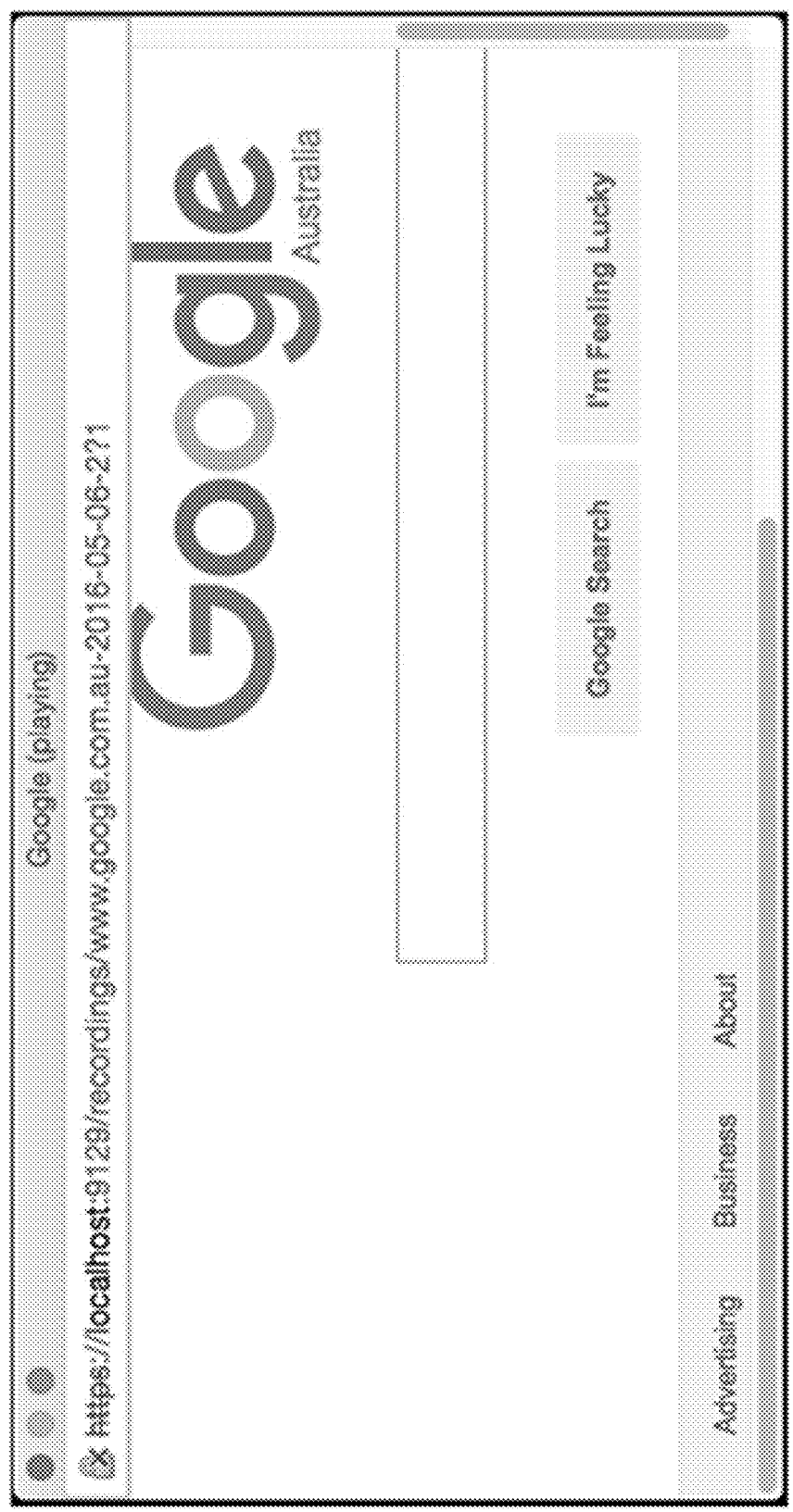
Figure 13:
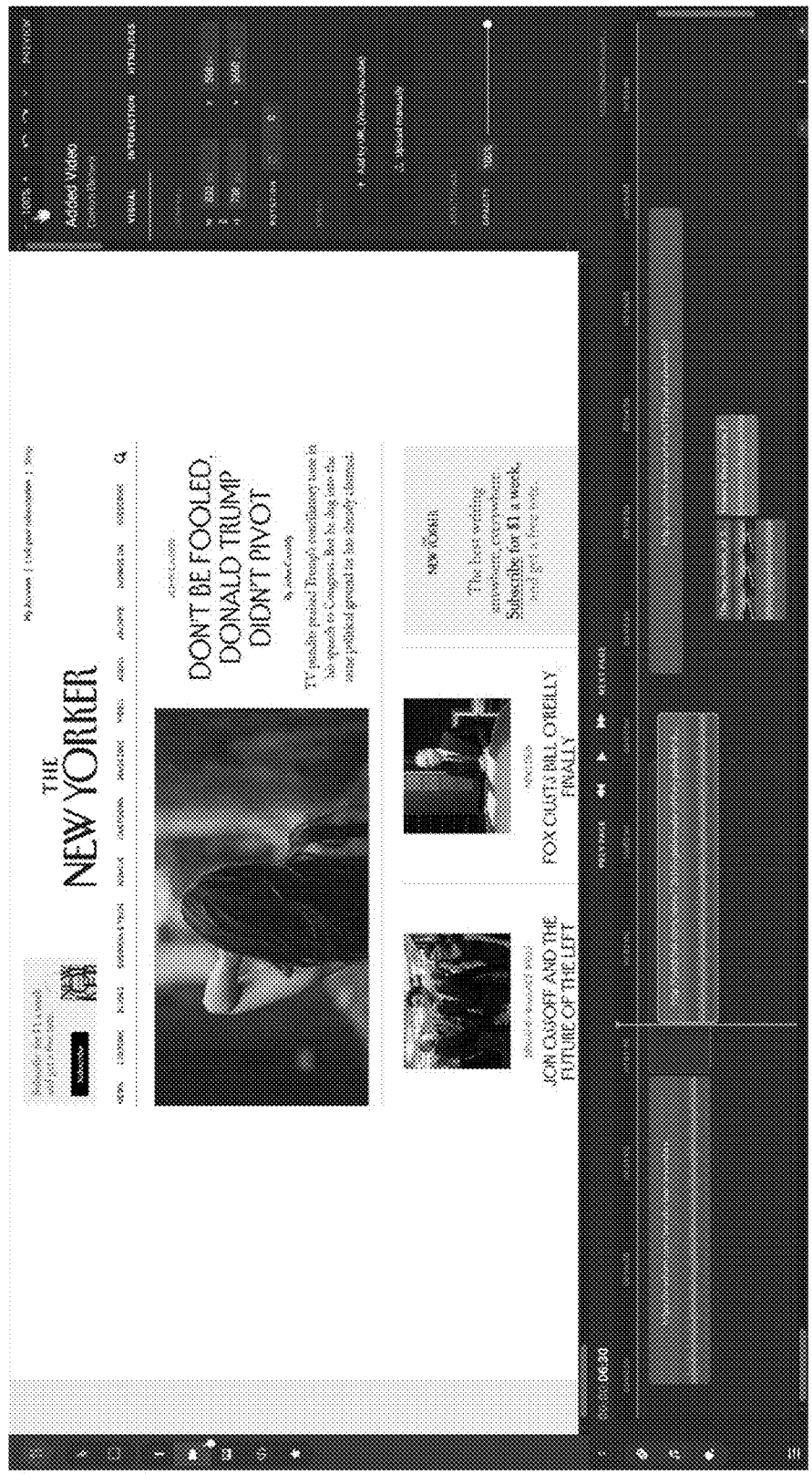
Figure 14:
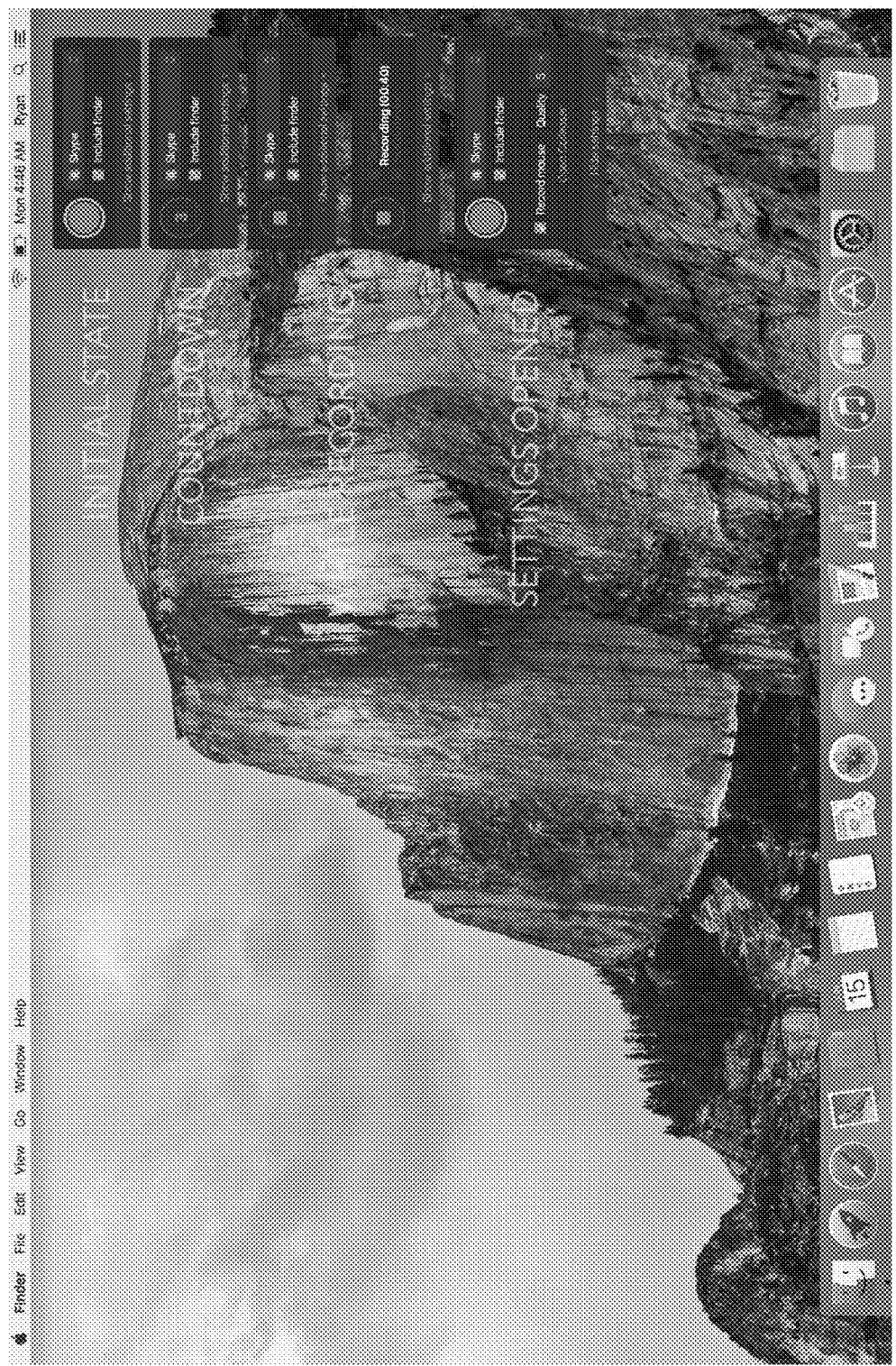
Figure 15A:
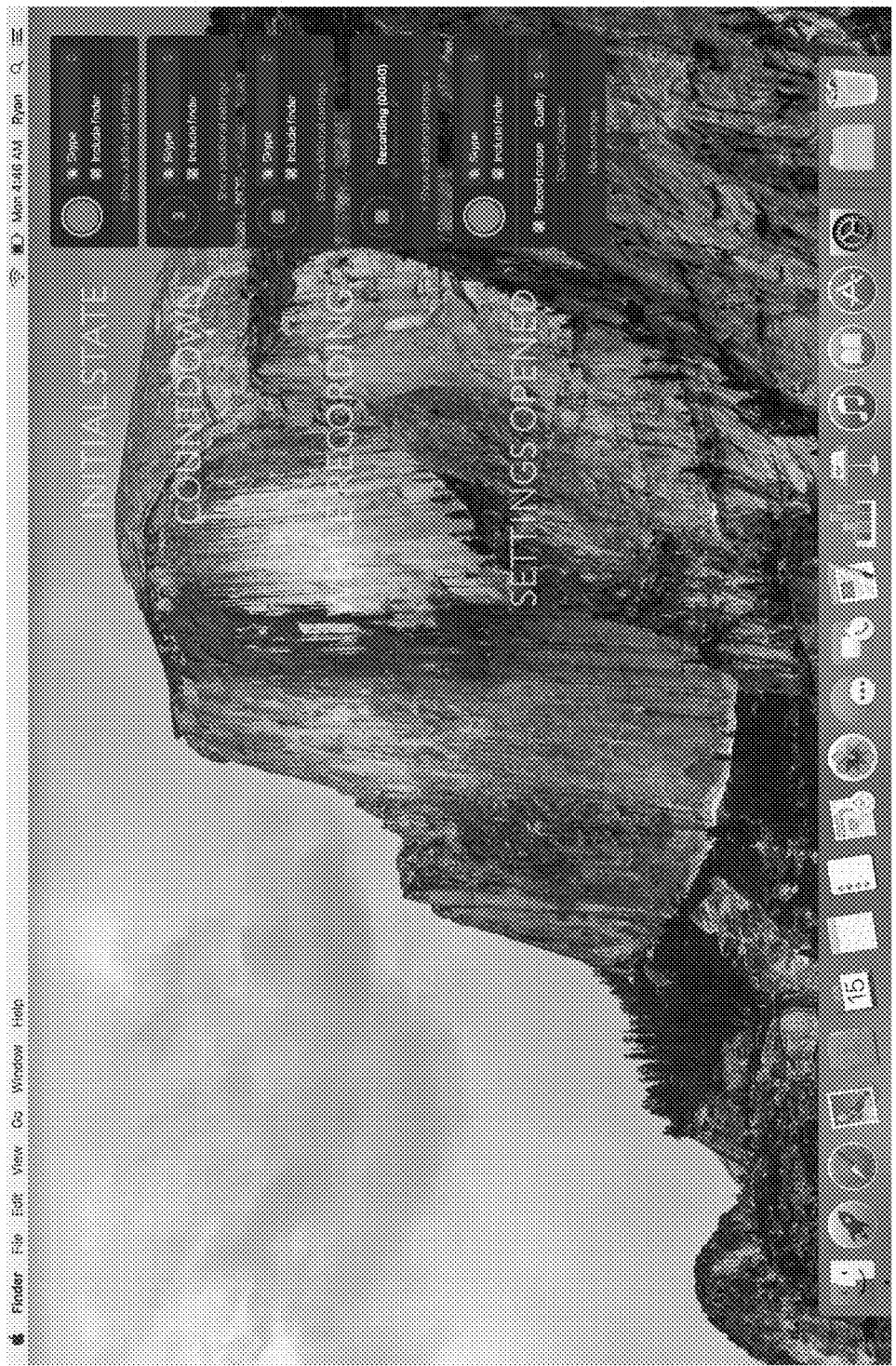
Figure 15B:
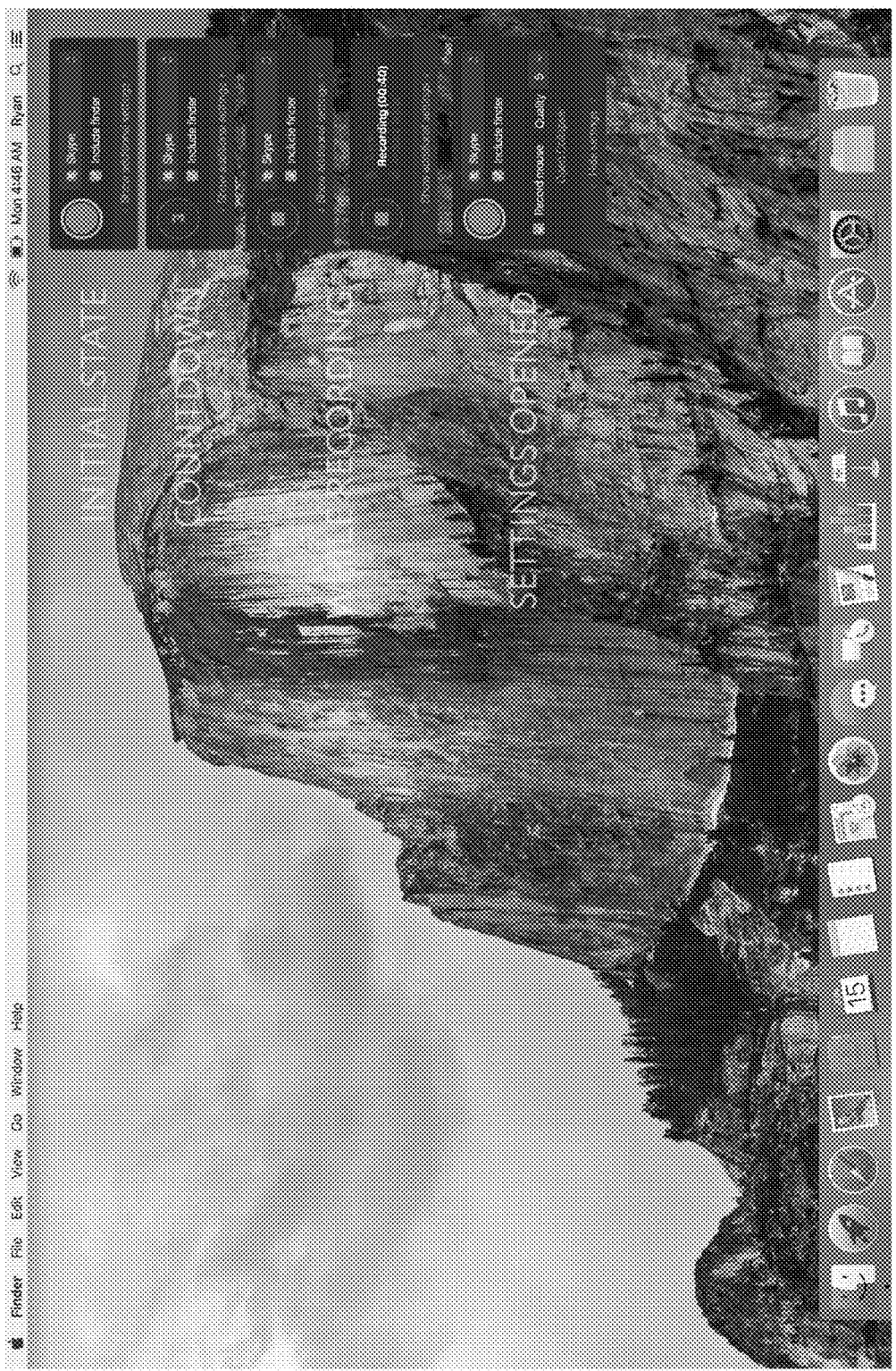
Figure 16:
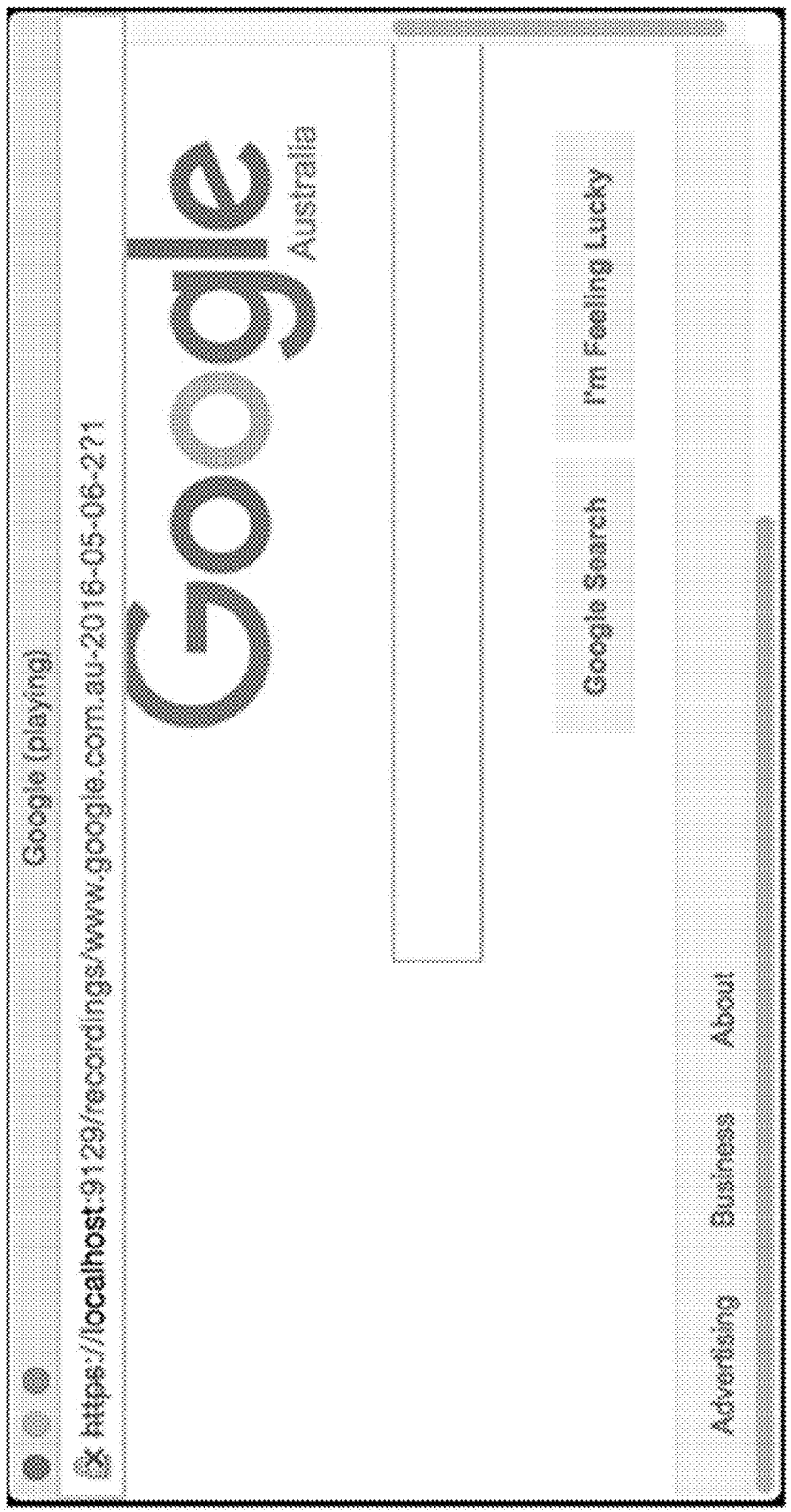

FIGS. 11-16 show exemplary screenshots illustrating the concepts described herein. FIG. 11 shows Recorder Extension, which is installed in the browser and allows the user to control the recording process and adjust configuration. FIGS. 12A-12B illustrate the HTML Player. FIG. 12A shows the Player (web based), which is replaying a content that was stored in a remote server. Timeline and controls help the user to navigate through the recording. FIG. 12B shows the Replay with a webcamera stream. It is fixed on top of the web page. The video and sound are synchronized with user actions on the web page. FIG. 13 illustrates the HTML Editor (web based), which lets users edit web content along with webcamera and sound the HTML Editor. FIG. 14 illustrates the Layers Recorder (Standalone), which records desktop applications on an OS X system (in this example). The recording output format is final cut project (collection of files in the directories with .plist files and .fcpx file) where each UI element of the recorded window(s) is a separate clip. FIGS. 15A-15B illustrate the Layers Editor, where FIG. 15A shows the Editor (Standalone), which it lets users edit each separate layer, e.g., UI element from the captured window. It renders all layers only if there is a change happened with elements properties (not by time). FIG. 15B shows Editor (Standalone), where the Record typing option allows user to record typing, with the same time intervals and deletions as the user has recorded. FIG. 16 illustrates the Layers Player, showing the Player (web based, in this case), which replays the format that is produced by standalone recorder and used by standalone editor.

With reference to FIG. 10, an exemplary system for implementing the invention includes a general purpose computing device in the form of a server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the server 20, such as during start-up, is stored in ROM 24.

The server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated server-readable media provide non-volatile storage of server readable instructions, data structures, program modules and other data for the server 20.

Although the exemplary environment described herein employs a hard disk, a removable magnetic disk 29 and a removable optical disk 31, it should be appreciated by those skilled in the art that other types of server readable media that can store data that is accessible by a server, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The server 20 includes a file system 36 associated with or included within the operating system 35, one or more application programs 37, other program modules 38 and program data 39. A user may enter commands and information into the server 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal servers typically include other peripheral output devices (not shown), such as speakers and printers.

The server 20 may operate in a networked environment using logical connections to one or more remote servers 49. The remote server (or servers) 49 may be another server, a server, a router, a network PC, a peer device or other common network node, and typically includes many or all of the elements described above relative to the server 20, although only a memory storage device 50 has been illustrated. The logical connections include a local area network (LAN) 51 and a wide area network (WAN) 52. Such networking environments are commonplace in offices, enterprise-wide server networks, Intranets and the Internet.

When used in a LAN networking environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the server 20, or portions thereof, may be stored in the remote memory storage device. It will be appreciated that the network connections shown are exemplary and other means of establishing a communications link between the servers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for recording, editing and reproduction of a user session on a computer, the method comprising:
   using a browser extension, initiating recording of user interactions with the computer;
   generating a recording of the user interactions as an event stream, wherein the recording includes mouse events and display events and Domain Object Model (DOM) mutations of displayed objects in response to the user interactions,
   wherein the user interactions are stored as a set of frames, where each application with which the user interacts through the displayed objects has a folder with frame numbers, and each frame includes a hierarchy of objects being stored;
   writing the recording into a script;
   assigning unique IDs to the displayed objects;
   capturing an initial state of the displayed objects;
   capturing events representing the user interactions and the DOM mutations;
   transmitting the recording of the events and the DOM mutations to file stored on a file system of a server;
   providing an interface to edit the recording stored on the server, wherein the editing includes changes to objects, elements, text or images stored in the recording; and
   in response to a user request to play back the recording
     (a) opening a browser window; and
     (b) playing back the edited recording;
   wherein the events and the DOM mutations are saved using JavaScript Object Notation (JSON) format.

2. The method of claim 1, wherein the user edits the recording stored locally on his computer.

3. The method of claim 1, wherein an object is re-drawn in key frames, such that its visuals are repeated.

4. The method of claim 1, wherein each displayed object in the hierarchy of mutated objects contains metadata describing the DOM mutations of the object in a list, and wherein the metadata is one of four types: image, graphics, text, or group.

5. The method of claim 4, wherein when a child object is selected by the user, its group object is selected instead.

6. The method of claim 1, wherein the recording is performed in a plugin for a browser.

7. The method of claim 1, wherein the recording also includes video.

8. The method of claim 1, wherein the recording also includes audio and video from a video input device of the computer.

9. The method of claim 1, wherein the user interactions include focus and blur events.

10. The method of claim 1, wherein the displayed objects are converted to serialized HTML and then stored in a JSON array.

11. The method of claim 1, further comprising storing the initial state of a web page displayed on the computer as a file object in a JSON array using any of attributes:
  a URL of the web page;
  an HTML of the web page;
  attributes of the web page HTML tag;
  a browser screen width;
  a browser screen height;
  an active element receiving a focus; and
  an initial scroll position of the page.

12. The method of claim 11, wherein the file object comprises a timeline reflecting any of event and DOM mutation attributes:
  type of event;
  event ID; and
  time.

13. The method of claim 1, further comprising saving a timeline of the user interactions and of the DOM mutations into a database, which is then stored on the server.

14. The method of claim 1, further comprising tab-based fast forward/rewind of the user interactions and the DOM mutations.

15. The method of claim 1, further comprising timeline-based fast forward/rewind of the user interactions and the DOM mutations.

16. The method of claim 1, further comprising webcam video recording and microphone sound recording, including reading recorder settings prior to the recording.

17. The method of claim 1, further comprising adding a timeline to the recording.

18. The method of claim 1, further comprising a topmost section of the recorder, where the user can customize recording and set the resolution of the recording window, and a lower section of the recorder, wherein the user can view all recordings as a list and can delete, share recordings or proceed to editing of an HTML recording.

19. The method of claim 1, further comprising an auto-complete of the recording.

20. The method of claim 1, wherein the user interacts with installed applications that generate the displayed objects and that are stored in a user local folder.

21. The method of claim 1, wherein, when rendering layers of a recording in an editor, the layers are rendered only when a change occurred to any layer.

22. A method for recording, editing and reproduction of a user session on a computer, the method comprising:
  initiating recording of user interactions with the computer;
  generating a recording of the user interactions, wherein the recording includes mouse events and display events;
  writing the recording into a script;
  assigning unique IDs to software elements;
  capturing an initial state of the software;
  capturing events representing the user interactions with the computer;
  sending the recording to a server;
  providing an interface to edit the recording stored on the server, wherein the editing includes changes to objects, elements, text or images stored in the recording; and
  in response to a user request to play back the recording
    (a) opening a browser window; and
    (b) playing back the edited recording;
  wherein the events are saved using JavaScript Object Notation (JSON) format, and
  wherein a Mouse folder stores movements of the mouse cursor, and wherein for each frame, a plist file is created that contains mouse coordinates, cursor type and size, and a flag indicating whether the mouse was clicked in that frame.

23. The method of claim 22, wherein all mouse cursor movements recorded during a session are contained in the Mouse folder.

24. A method for recording, editing and reproduction of a user session on a computer, the method comprising:
  initiating recording of user interactions with the computer;
  generating a recording of the user interactions, wherein the recording includes mouse events and display events;
  writing the recording into a script;
  assigning unique IDs to software elements;
  capturing an initial state of the software;
  capturing events representing the user interactions with the computer;
  sending the recording to a server;
  providing an interface to edit the recording stored on the server, wherein the editing includes changes to objects, elements, text or images stored in the recording; and
  in response to a user request to play back the recording
    (a) opening a browser window; and
    (b) playing back the edited recording;
  wherein the events are saved using JavaScript Object Notation (JSON) format; and
  PDF parsing on the server, including parsing HTML video into PDF files frame by frame using PhantomJS (a virtual browser without a graphic shell) and CasperJS (a plug-in for PhantomJS).

25. The method of claim 24, wherein when all PDFs are completed, the server packs them into an archive.

26. A method for recording, editing and reproduction of a user session on a computer, the method comprising:
  initiating recording of user interactions with the computer;
  generating a recording of the user interactions, wherein the recording includes mouse events and display events;
  writing the recording into a script;
  assigning unique IDs to software elements;
  capturing an initial state of the software;
  capturing events representing the user interactions with the computer;
  sending the recording to a server;
  providing an interface to edit the recording stored on the server, wherein the editing includes changes to objects, elements, text or images stored in the recording; and
  in response to a user request to play back the recording
    (a) opening a browser window; and
    (b) playing back the edited recording;
  wherein the events are saved using JavaScript Object Notation (JSON) format, and wherein the recorder further comprises buttons for PDF un-parsing and deletion.

* * * * *